(12) United States Patent
Grove (10) Patent No.: US 7,531,758 B2
(45) Date of Patent: May 12, 2009

(54) CONFIGURABLE CONVEYOR AND WEIGHING CONVEYOR APPARATUS

(75) Inventor: Joseph A. Grove, Duncansville, PA (US)

(73) Assignee: Ossid LLC, Rocky Mount, NC (US)

( * ) Notice: Subject to any disclaimer, the term of this patent is extended or adjusted under 35 U.S.C. 154(b) by 71 days.

(21) Appl. No.: 11/750,092

(22) Filed: May 17, 2007

(65) Prior Publication Data

US 2008/0283306 A1 Nov. 20, 2008

(51) Int. Cl.
*G01G 19/00* (2006.01)

(52) U.S. Cl. .................................. 177/119; 177/145

(58) Field of Classification Search ................ 177/119, 177/145
See application file for complete search history.

(56) References Cited

U.S. PATENT DOCUMENTS

| | | | |
|---|---|---|---|
| 2,653,700 A | | 7/1953 | Sloane |
| 2,896,774 A | | 7/1959 | Long et al. |
| 3,163,248 A | | 12/1964 | Farquhar |
| 3,294,218 A | * | 12/1966 | Chantland .................... 198/826 |
| 3,955,665 A | | 5/1976 | Pettis, Jr. et al. |
| 4,228,891 A | | 10/1980 | Hanson |
| 4,392,535 A | | 7/1983 | Fujii et al. ...................... 177/1 |
| 4,463,816 A | | 8/1984 | MacFarlane |
| 4,557,341 A | * | 12/1985 | Söderholm .................... 177/16 |
| 5,326,938 A | | 7/1994 | Tolson |
| 5,684,275 A | | 11/1997 | Tolson |
| 5,696,354 A | | 12/1997 | Linville, Jr. et al. |
| 6,095,320 A | | 8/2000 | DeMong et al. |
| 6,131,726 A | | 10/2000 | Hovsto et al. |
| 2003/0230435 A1 | * | 12/2003 | Conard et al. ............. 177/25.15 |

FOREIGN PATENT DOCUMENTS

| | | |
|---|---|---|
| GB | 1032664 | 6/1966 |
| GB | 2096561 | 10/1982 |
| GB | 2143959 | 2/1985 |

* cited by examiner

*Primary Examiner*—Randy W Gibson
(74) *Attorney, Agent, or Firm*—Thompson Hine LLP (57) ABSTRACT

An apparatus for weighing and labeling of a product in a high speed processing environment includes an entry conveyor having an entry end and an exit end. A weighing conveyor has an entry end for receiving the product from the exit end of the entry conveyor and an exit end from which the product is delivered from the weighing conveyor. The weighing conveyor is operatively mounted to a weighing device to produce product weight information for the product being transported on the weighing conveyor. The weighing conveyor includes a first conveyor member extending from the entry end to the exit end of the weighing conveyor and a second conveyor member extending from the entry end to the exit end of the weighing conveyor. The first and second conveyor members operate cooperatively to convey the product from the entry end toward the exit end. A first angle measured from the first conveyor member to the second conveyor member is adjustable prior to a conveying operation to accommodate a bottom of the product so as to reduce shock loading on the weighing device as the product is transferred from the entry conveyor to the weighing conveyor.

19 Claims, 8 Drawing Sheets

CONFIGURABLE CONVEYOR AND WEIGHING CONVEYOR APPARATUS

TECHNICAL FIELD

The present application relates to a method and apparatus for weighing items, more particularly to a weighing conveyor apparatus and configurable conveyor.

BACKGROUND

In high speed packaging, weighing and labeling operations, after the step of wrapping a product such as meat or poultry for sale in a supermarket, the next steps are for that product to be weighed and labeled. If the product happens to be one with a flat bottom or one supported in a tray, it tends to function smoothly in a conveyorized operation. If it is a product that does not have a flat bottom, such as a whole bird poultry product or is another type of product having an irregular surface on which the product typically rests while being conveyed, the swift movement of a conventional flat horizontal conveyor may induce oscillation or wobble in the product while being conveyed. The reason for this is that in many conveyorized packaging operations, the products can be processed at speeds of 70 or more pieces per minute. That amount of speed will frequently jolt a whole bird poultry product such that it rocks on its non-flat bottom and begins to wobble.

Wobble or oscillation by itself may not present a problem if it is being transported merely to get to a destination, but when the purpose of the transport is to weigh and label the bird, unreliability and inaccuracy may occur. A wobble in the weighing operation can result in an incorrect weight. A wobble in the labeling operation can result in an improperly positioned label. In addition, the wobble on a flat open conveyor belt frequently results in an orientational misalignment of the product, further disturbing label location.

A conventional conveyor is one which has a basically flat horizontal belt, or similar supporting surface, and transports the product through the operative stations. In the case of a multiple process sequence, typically entry, weighing, and labeling, the conveyor system may be a series of short conveyors working in sequence.

SUMMARY

In an aspect, an apparatus for weighing and labeling of a product in a high speed processing environment includes an entry conveyor having an entry end and an exit end. A weighing conveyor has an entry end for receiving the product from the exit end of the entry conveyor and an exit end from which the product is delivered from the weighing conveyor. The weighing conveyor is operatively mounted to a weighing device to produce product weight information for the product being transported on the weighing conveyor. The weighing conveyor includes a first conveyor member extending from the entry end to the exit end of the weighing conveyor and a second conveyor member extending from the entry end to the exit end of the weighing conveyor. The first and second conveyor members operate cooperatively to convey the product from the entry end toward the exit end. A first angle measured from the first conveyor member to the second conveyor member is adjustable prior to a conveying operation to accommodate a bottom of the product so as to reduce shock loading on the weighing device as the product is transferred from the entry conveyor to the weighing conveyor.

In another aspect, a method for weighing and labeling of a product in a high speed processing environment is provided. The method includes providing an entry conveyor having an entry end and an exit end. A weighing conveyor is provided having an entry end for receiving the product from the exit end of the entry conveyor and an exit end from which the product is delivered from the weighing conveyor. The weighing conveyor is operatively mounted to a weighing device for producing product weight information for the product being transported on the weighing conveyor. The weighing conveyor includes a first conveyor member extending from the entry end to the exit end of the weighing conveyor and a second conveyor member extending from the entry end to the exit end of the weighing conveyor. The first and second conveyor members operate cooperatively to convey the product from the entry end toward the exit end. A first angle measured from the first conveyor member to the second conveyor member is adjusted prior to a conveying operation to accommodate a bottom of the product thereby reducing shock loading on the weighing device as the product is transferred from the entry conveyor to the weighing conveyor.

In a third aspect, an apparatus for weighing and labeling of a product in a high speed processing environment includes an entry conveyor having an entry end and an exit end. A weighing conveyor has an entry end for receiving the product from the exit end of the entry conveyor and an exit end from which the product is delivered from the weighing conveyor. The weighing conveyor is operatively mounted to a weighing device to produce product weight information for the product being transported on the weighing conveyor. The weighing conveyor includes a first conveyor member extending from the entry end to the exit end of the weighing conveyor and a second conveyor member extending from the entry end to the exit end of the weighing conveyor. The first and second conveyor members operating cooperatively to convey the product from the entry end toward the exit end. Each first conveyor member and second conveyor member is adjustable independently of the other conveyor member to an angle relative to the horizontal to form a variety of conveyor surface configurations.

The details of one or more embodiments are set forth in the accompanying drawings and the description below. Other features, objects, and advantages will be apparent from the description and drawings, and from the claims.

DETAILED DESCRIPTION

Figure 1:
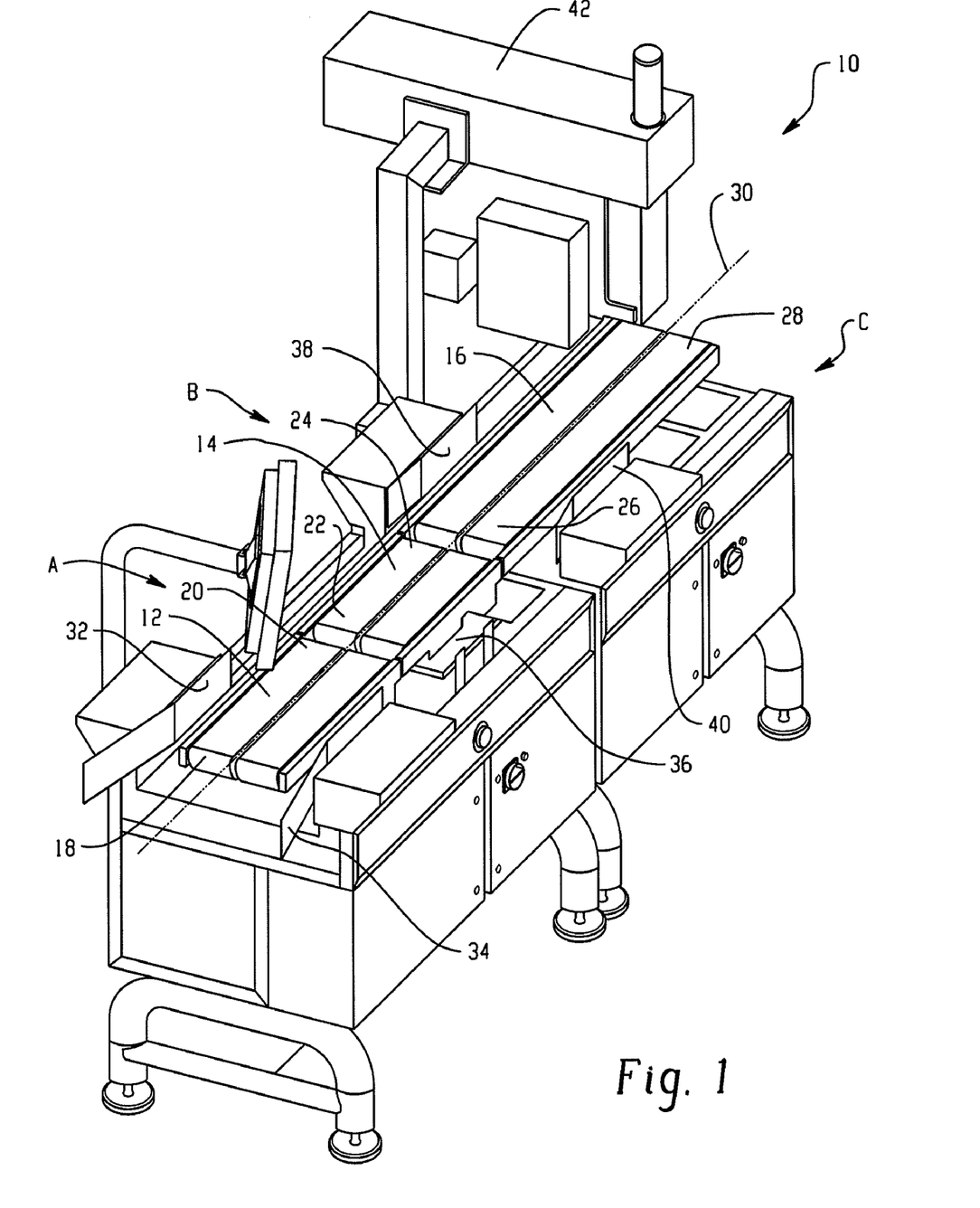
FIG. 1 is a perspective view of an embodiment of an apparatus for weighing and labeling of products with its conveyors in horizontal configurations providing a horizontal conveying surface.

Referring to FIG. 1, an apparatus 10 for automatic, high speed weighing and labeling of products includes three operative stations A, B and C. Station A is an entry station including an entry conveyor 12, station B is a weighing station including a weighing conveyor 14 and station C is a labeling station including a labeling conveyor 16. The entry conveyor 12 includes an entry end 18 for receipt of product and exit end 20 that feeds product to the weighing conveyor 14. Likewise, the weighing conveyor 14 includes an entry end 22 that receives product from the entry conveyor 12 and an exit end 24 that feeds product to the labeling conveyor 16. The labeling conveyor 16 includes an entry end 26 that receives product from the weighing conveyor 14 and an exit end 28 that transports product from the labeling conveyor. As can be seen, each of the conveyors 12, 14 and 16 are aligned linearly defining a linear conveyor path 30 through the apparatus 10.

Station A is used to align the product on the conveyor system and to transfer the product onto the weighing conveyor 14 of station B. Station A includes vertically oriented infeed guides 32 and 34 that are used to align the product on the entry conveyor 12. Station B is used to weigh the product as it moves along the weighing conveyor 14. A weighing device 36 is connected to the weighing conveyor 14 so that weight information can be collected, which will be described in greater detail below. Station C is used to affix a label to the product and includes vibration dampers 38 and 40 for additional product alignment and limiting product vibration moving onto the labeling conveyor 16 and a labeling apparatus 42, which is used to print and apply a label to the product. In some embodiments, the label may include the weight of the product determined using the weighing conveyor 14 and the weighing device 36 of station B.

In some embodiments, the product may move continuously through the apparatus 10, stations A, B and C, without any stops along the way. In other embodiments, the product may stop for a brief period of time at, for example, station A until a weighing operation for an adjacent product is completed.

Figure 2:
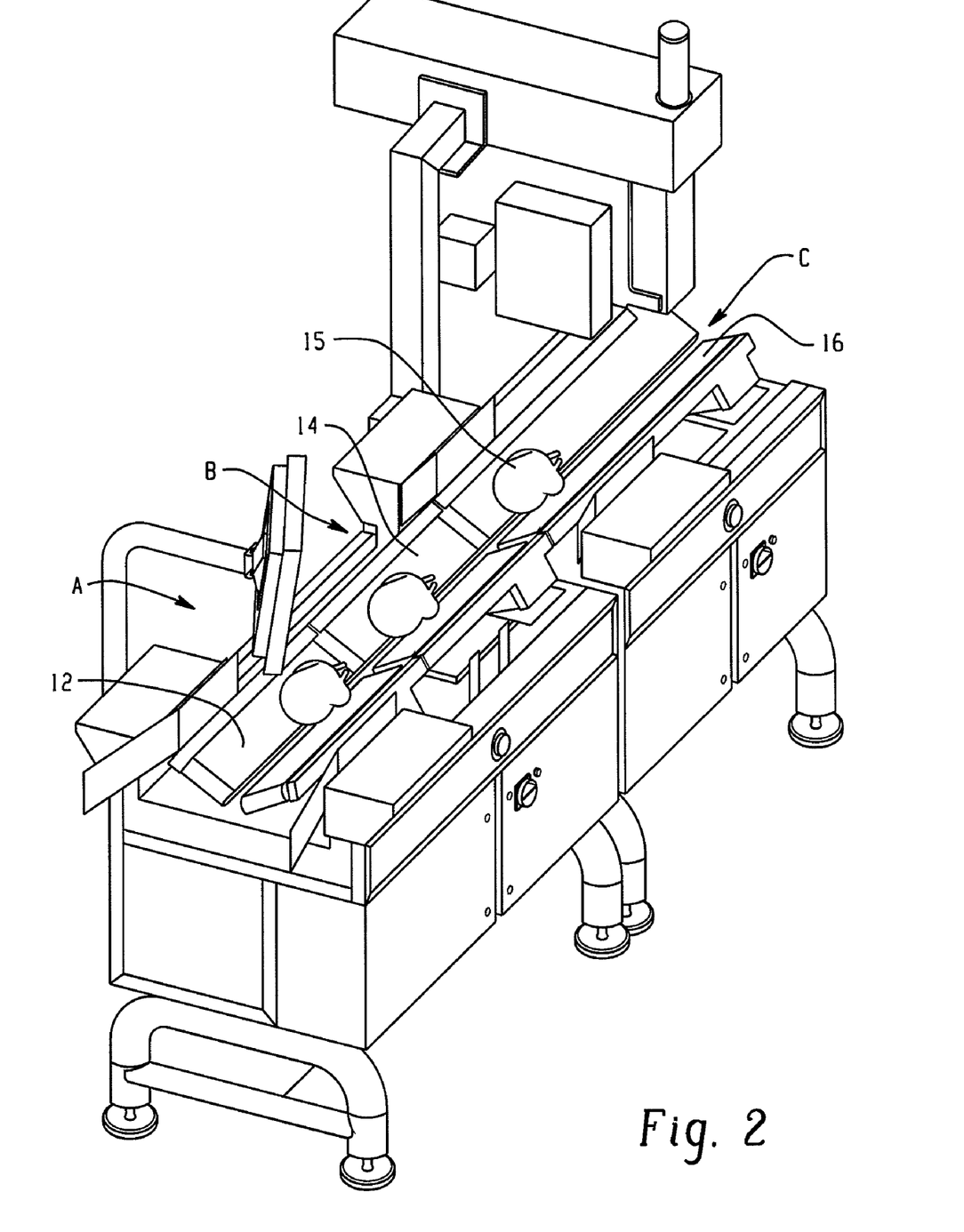
FIG. 2 is a perspective view of the apparatus of FIG. 1 with its conveyors in V-shaped configurations providing a V-shaped conveying surface.

Referring to FIG. 2, one or more of the entry, weighing and labeling conveyors 12, 14 and 16 are adjustable from a horizontal orientation of FIG. 1 to a V-shaped orientation of FIG. 2. In FIG. 2, each of the entry, weighing and label conveyors 12, 14 and 16 are adjustable to the V-shaped configuration. As will be described, adjustment to the V-shaped configuration can reduce product movement as it travels from conveyor to conveyor, particularly in instances where a product having a non-flat bottom (e.g., a bagged whole bird 15) is being conveyed. As used herein, the term "non-flat bottom" is not meant to exclude products with partially flat bottoms. Additionally, the V-shaped configuration of the weighing conveyor 14 (and entry conveyor 12) can reduce shock applied to the weighing conveyor (compared to a flat conveyor) as the product with a non-flat bottom is transferred thereon. Reduction of shock at the weighing station B can allow for quicker acquisition of weight information, which can allow for an increase in speed of the conveyor system thereby increasing throughput of product.

Figure 3:
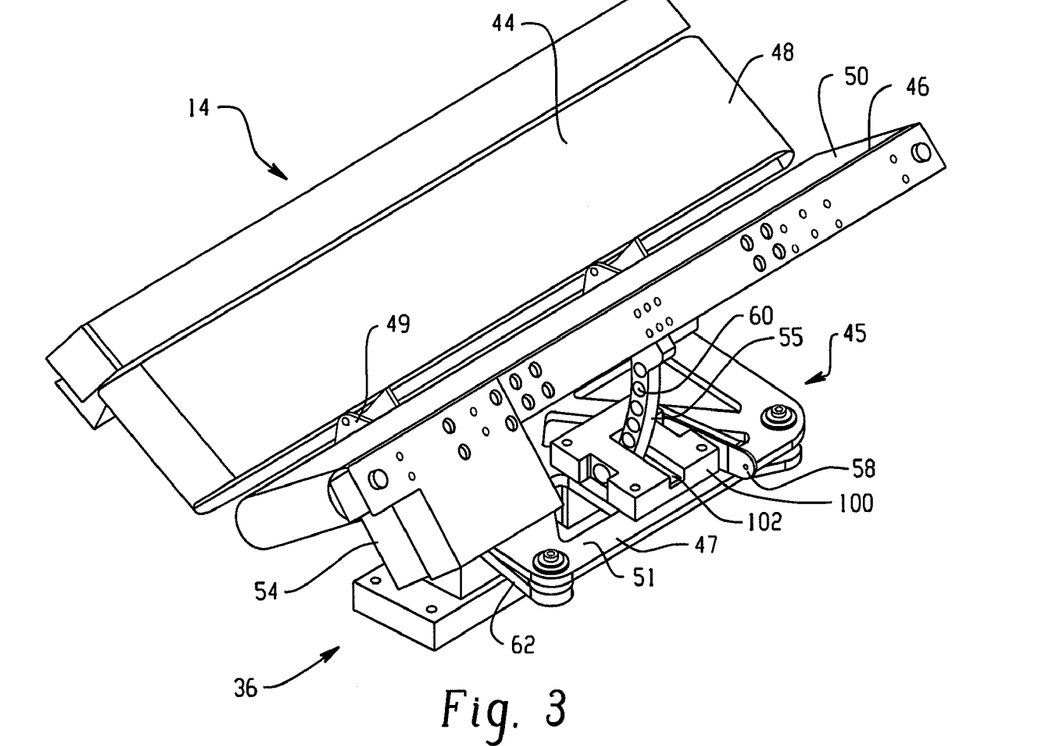
FIG. 3 is a perspective view of an embodiment of a weighing conveyor and weighing device for use in the apparatus of FIG. 1.
Figure 4:
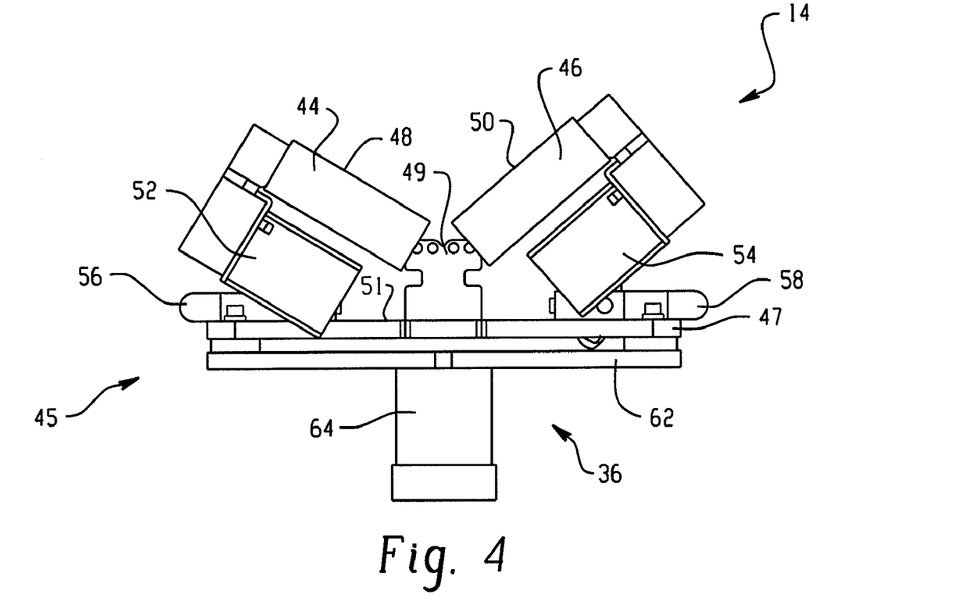
FIG. 4 is an end view of the weighing conveyor and weighing device of FIG. 3.

FIGS. 3 and 4 illustrate the weighing conveyor 14 in isolation connected to the weighing device 36. The weighing conveyor 14 is of a two part design including a first conveyor member 44 and a second conveyor member 46. Each conveyor member 44 and 46 includes a respective conveyor belt 48, 50 and a motor 52, 54 for use in moving the conveyor belts.

The weighing conveyor 14 is connected to the weighing device 36 using a dampening mount assembly 45 that includes a conveyor mount plate 47 and a conveyor swivel mount 49 connected to an upper surface 51 of the conveyor mount plate. The first conveyor member 44 and the second conveyor member 46 are pivotally connected to the conveyor swivel mount 49 to provide a respective pivot axis for each the first and second conveyor members 44 and 46 that extends substantially parallel with the conveying direction 30 (FIG. 1). A conveyor adjustment brace 53 and 55 (only conveyor adjustment brace 55 can be seen in FIG. 3) is connected to the first conveyor member 44 and the second conveyor member 46. The conveyor adjustment brace 53 and 55 allows positioning (e.g., manually) of the first conveyor member 44 and the second conveyor member 46 at a desired incline angle. A conveyor adjustment lever 56, 58 is used to set or allow adjustment of the first and second conveyor members 44 and 46 by inserting or releasing a pin (not shown, but internal of brace frame 100 and projecting into slot 102 through which the brace extends) within openings 60 at various elevations along the lengths of the conveyor adjustment braces 53 and 55. The pin may be spring loaded. The lever 56 may be biased to normally maintain the pin within the brace locking position.

Figure 5:
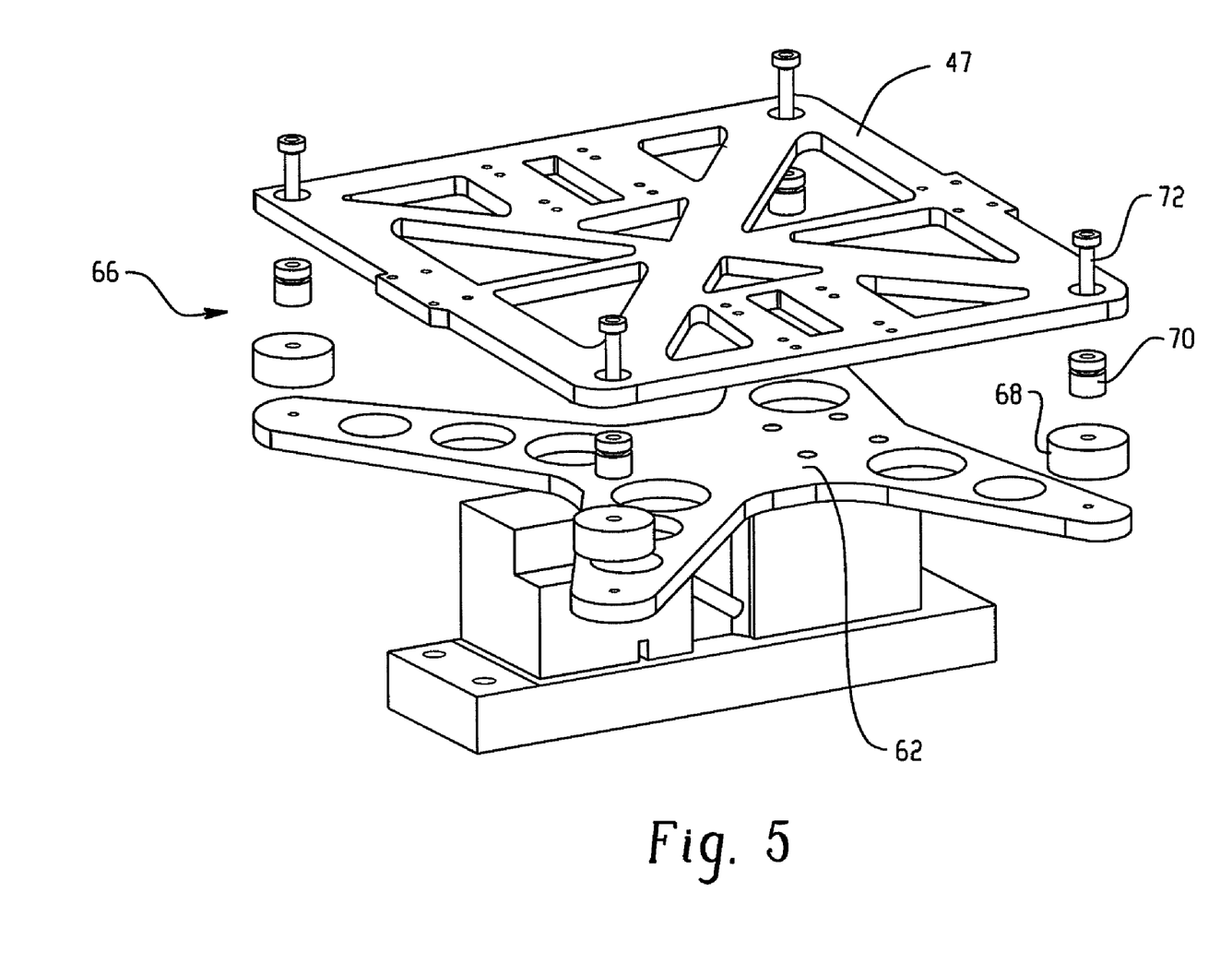
FIG. 5 is a perspective view of an embodiment of a suspension system for use with the weighing conveyor and weighing device of FIG. 4.

The conveyor mount plate 47 is mounted upon a loadcell plate 62, which is mounted to a loadcell 64. Loadcell 64 provides weight information that can be processed by a processor to determine weight of the product. Referring now to FIG. 5, the mount plate 47 is mounted to the loadcell plate 62 using a dampening control assembly 66 that includes a damping pad 68 (e.g., formed of a synthetic viscoelastic urethane polymer, such as that commercially available from Sorbothane Inc. of Kent, Ohio), a high damp PVC bushing 70 and a linear motion fastener 72. The damping pad 68 and bushing 70 cooperate to damp both upward and downward movement of the mount plate 47 relative to the loadcell plate 62.

Figure 6:
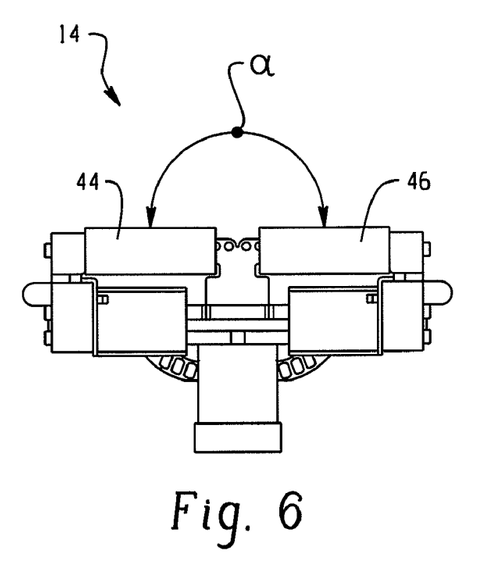
FIGS. 6-9 show the weighing conveyor of FIG. 4 in various orientations
Figure 7:
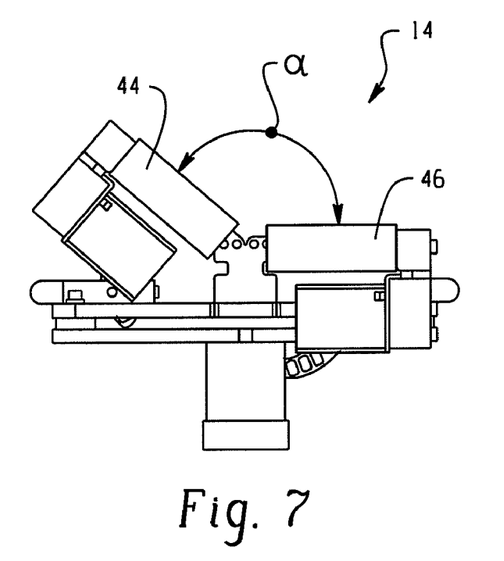
Figure 8:
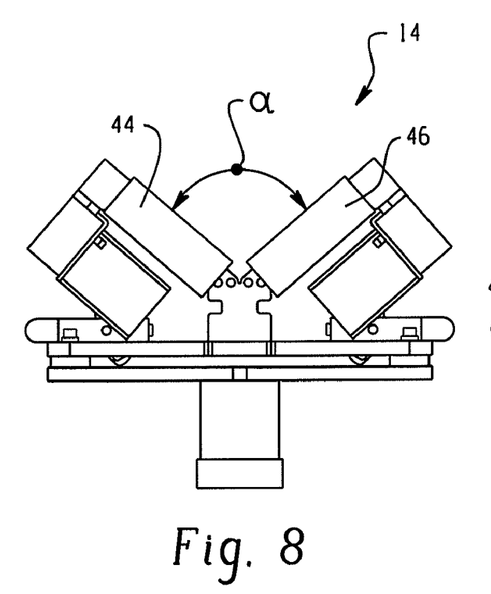
Figure 9:
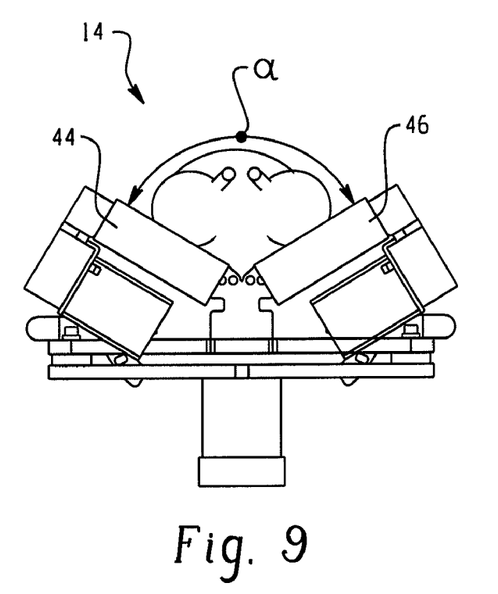

FIGS. 6-9 illustrate the weighing conveyor 14 with its conveyor members 44 and 46 at various angles $\alpha$ measured between the conveyor members. In some embodiments, each of the conveyor members 44 are independently adjustable from zero degrees to the horizontal to 90 degrees to the horizontal. FIG. 6 illustrates a horizontal orientation where $\alpha$ is about 180 degrees to define a substantially horizontal conveying surface. FIG. 7 illustrates the second conveyor member 46 in its horizontal orientation and the first conveyor member 44 in an inclined orientation to define a V-shaped conveying surface with $\alpha$ at about 135 degrees. The orientation of FIG. 7 may allow for accommodation of products that are weighted to one side, for example. FIG. 8 illustrates the first and second conveyor members 44 and 46 in a V-shaped orientation having an $\alpha$ of about 90 degrees. FIG. 9 illustrates the first and second conveyors 44 and 46 in another V-shaped orientation having an $\alpha$ of about 135 degrees to accommodate a frozen, bagged bird. The angle $\alpha$, in some embodiments, may be set to a plurality of angles ranging between 180 degrees and 45 degrees or less. It should be noted that while the weighing conveyor 14 is focused on in the above discussion with regard to the moveable conveyor members, the entry conveyor 12 and labeling conveyor 16 may operate in the same or similar fashion to move between horizontal and V-shaped configurations.

The V-shaped configuration of the conveyor belts can increase the stability of non-flat bottom packages. The conveyor adjustment brace and lever can hold the conveyor members at multiple inclined angles to accommodate product of various shapes. Either conveyor member can be adjusted independently of the other, e.g., to create a non-symmetric configuration. The conveyors can be additionally adaptable to flat bottom packages or packages that do not need the V-shaped configuration by placing the conveyor members in their horizontal configurations. The weighing conveyor takes advantage of a suspension system for vibration and shock dampening. Synthetic viscoelastic urethane polymer pads surrounded by high damp PVC bushings can dampen vibrations in multiple directions, which can decrease the loadcell stabilization time by reducing initial shock that occuring when a product is initially presented to the weighing conveyor. In addition to bagged, frozen birds, the above-described conveyor system may be used to convey HFFS packaging, vacuum packed product, sausage, etc.

Figure 10:
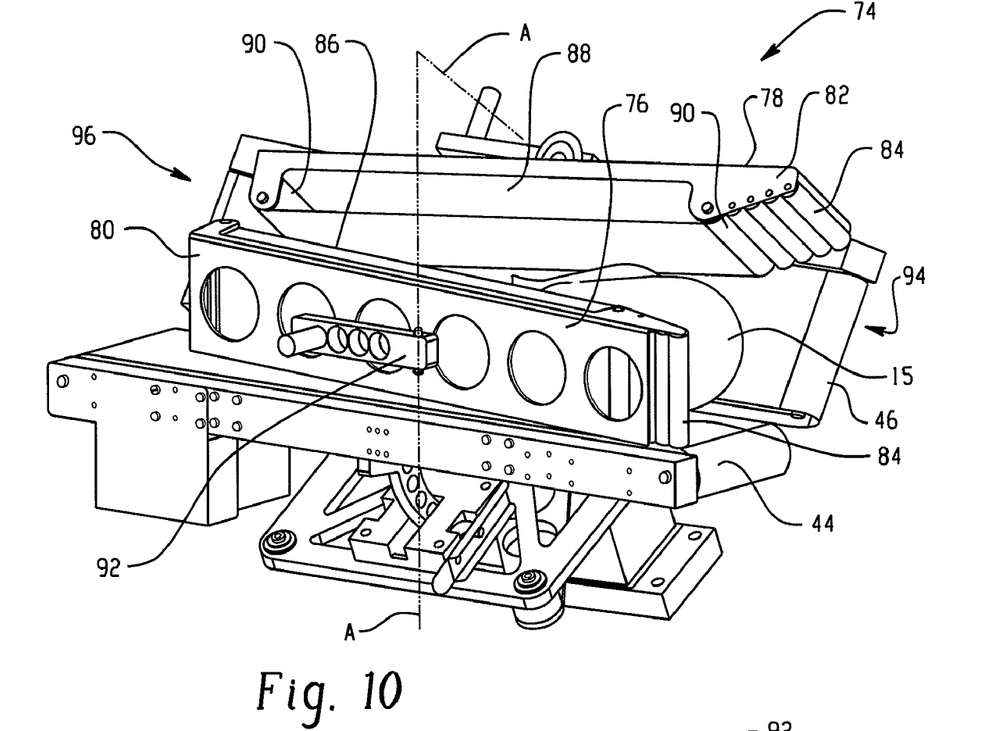
FIG. 10 is a perspective view of another embodiment of weighing conveyor including flexible side guides.

Referring to FIG. 10, another weighing conveyor embodiment 74 includes side guides 76 and 78. The side guides 76 and 78 are connected at outside edges of each of the conveyor members 44 and 46 and extend upwardly therefrom. Each side guide 76 and 78 includes a belt housing 80, 82 that includes a number of rollers 84 and a flexible belt 86, 88 wound around two rollers 90. The side guides 76 and 78 are pivotally connected to their respective conveyor member 44 and 46 at a pivot axis A so that a size of an entry end opening 94 and an exit end opening 96 can change as the product moves along the conveyor path.

Figure 11:
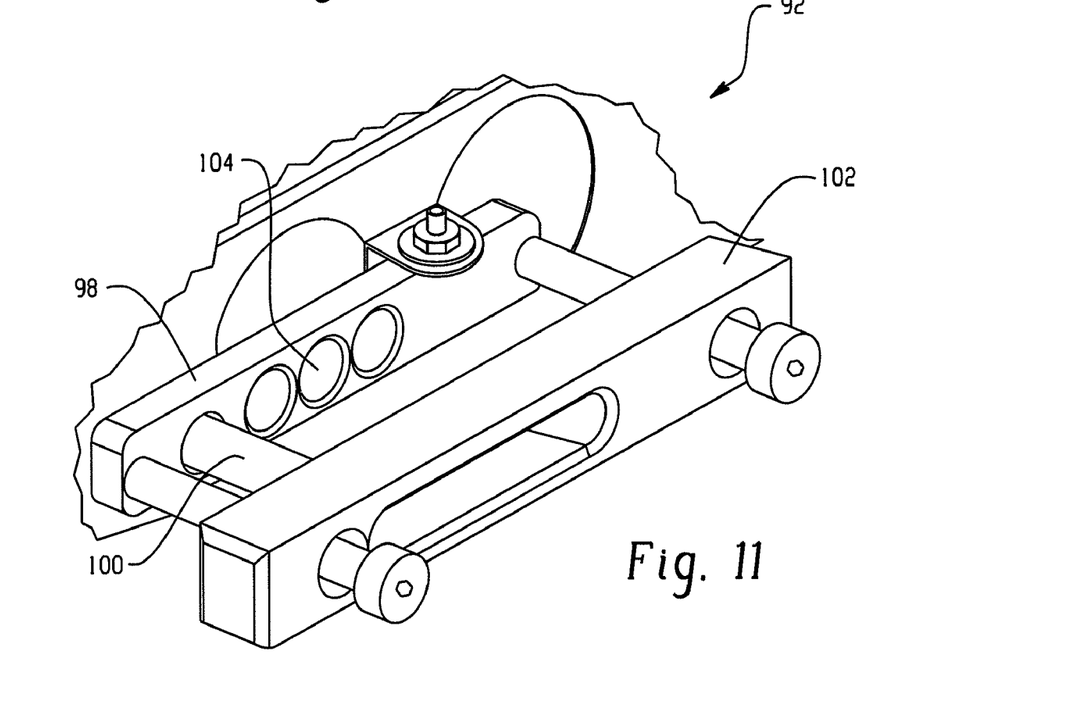
FIG. 11 is a detail view of an embodiment of a pivot bracket assembly for use with the side guides of FIG. 10.

Referring to FIG. 11, a pivot bracket assembly 92 is used to further dampen vibrations as the product contacts the side guides 76 and 78. Pivot bracket assembly 92 includes a pivot bracket 98 that is pivotally connected to the associated side guide. The pivot bracket 98 has openings 104 that are sized to receive a dampening cylinder 100. The dampening cylinder 100 may be a single acting air cylinder with spring return. A port on the cylinder can have a flow control to regulate the flow of air. On compression, an internal spring, along with a regulated air bleed, forces the side guides 76 and 78 to pivot in a controlled manner. A side guide adjustment block 102 is provided to allow adjustment of the dampening cylinder's position within another of the openings 104. Other embodiments are contemplated such as use of conical compression springs or an extension with spring return in the pivot bracket assembly 92.

Figure 12:
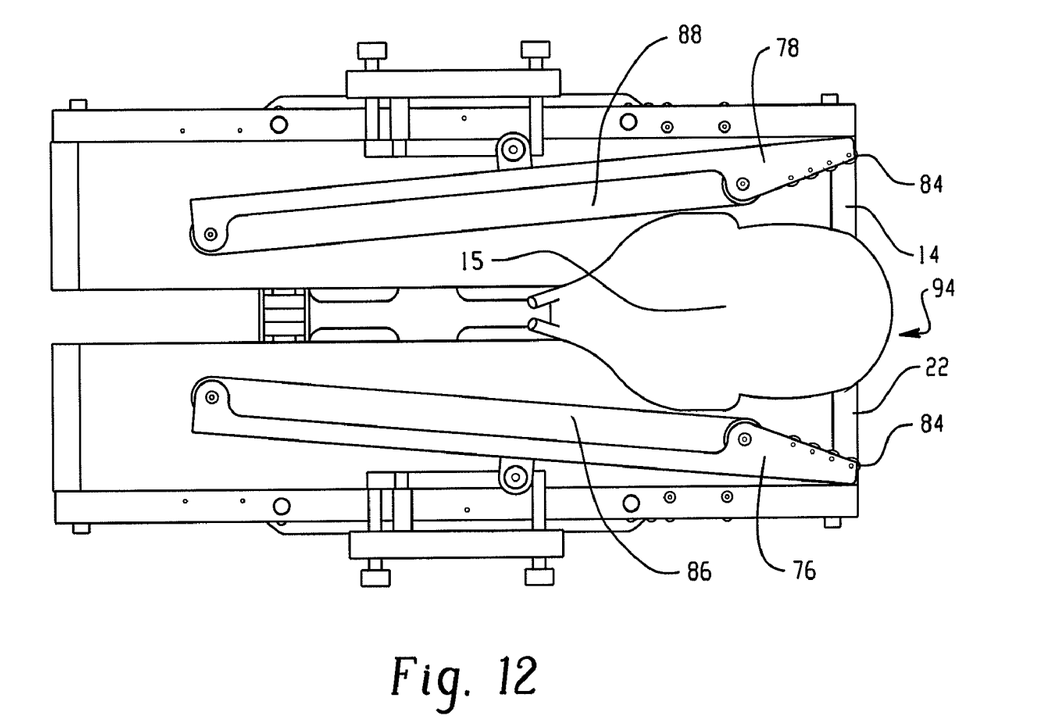
FIGS. 12-14 illustrate operation of the side guides of FIG. 10 as product travels along the conveyor.
Figure 13:
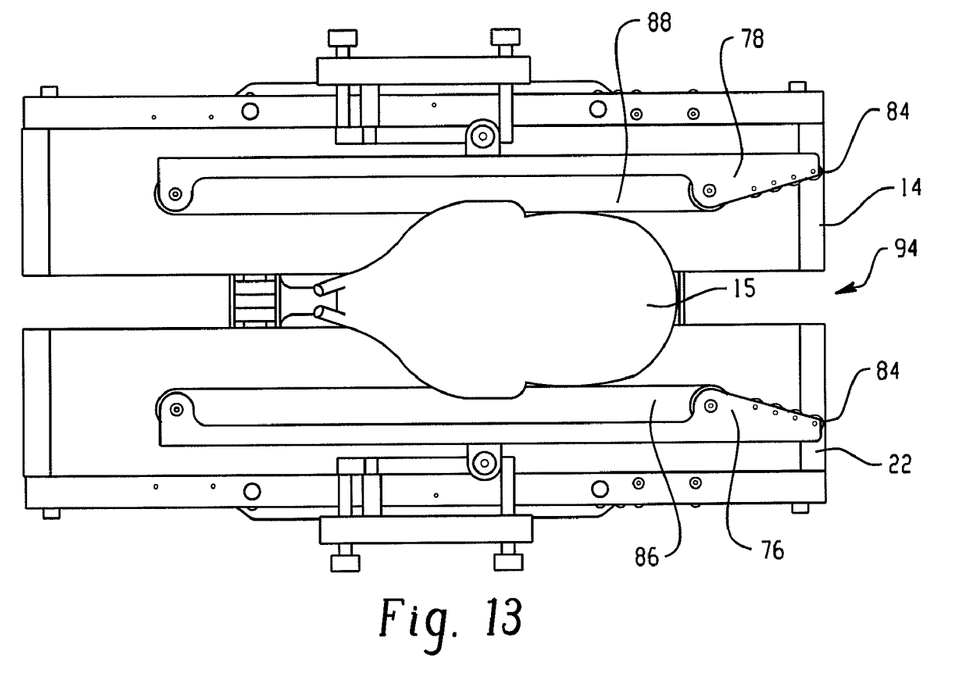
Figure 14:
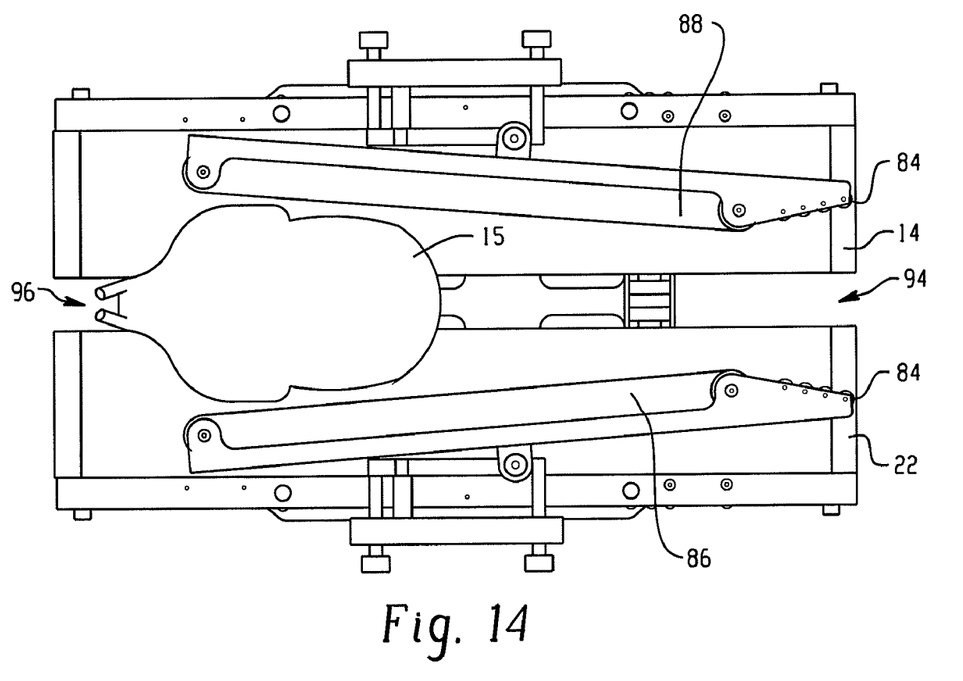

FIGS. 12-14 illustrate operation of the side guides 76 and 78 as the product 15 moves along the conveyor 14 in its V-shape configuration. As the product enters at the entry end 22 of the weighing conveyor 14, the entry end opening 94 is forced open by contact between the product and the rollers 84, forcing the side guides 76 and 78 into a funnel-like shape. The product 15 then contacts the flexible belts 86 and 88 as it moves between the side guides 76 and 78. As the product 15 exits the weighing conveyor 14 the exit end opening 96 is forced open, placing the side guides 76 and 78 in their initial orientation.

The flexible side guides 76 and 78 can be used to guide and stabilize contoured packages through the apparatus 10 including the weighing conveyor 14. The side guides 76 and 78, by contacting the product 15, can immediately stabilize the product to the conveyor surface thereby allowing earlier and accurate acquisition of weight information.

It is to be clearly understood that the above description is intended by way of illustration and example only and is not intended to be taken by way of limitation, and that changes and modifications are possible. Accordingly, other embodiments are within the scope of the following claims.

What is claimed is:

1. An apparatus for weighing and labeling of a product in a high speed processing environment, the apparatus comprising:
   an entry conveyor having an entry end and an exit end; and
   a weighing conveyor having an entry end for receiving the product from the exit end of the entry conveyor and an exit end from which the product is delivered from the weighing conveyor, the weighing conveyor operatively mounted to a weighing device to produce product weight information for the product being transported on the weighing conveyor,
   the weighing conveyor comprising a first conveyor member extending from the entry end to the exit end of the weighing conveyor and a second conveyor member extending from the entry end to the exit end of the weighing conveyor, the first and second conveyor members operating cooperatively to convey the product from the entry end toward the exit end,
   wherein a first angle measured from the first conveyor member to the second conveyor member is adjustable prior to a conveying operation to accommodate a bottom of the product so as to reduce shock loading on the weighing device as the product is transferred from the entry conveyor to the weighing conveyor,
   wherein the first conveyor member includes a first conveyor belt extending from the entry end to the exit end of the weighing conveyor and the second conveyor member includes a second conveyor belt extending from the entry end to the exit end of the weighing conveyor, wherein the first conveyor member and the second conveyor member are adjusted prior to locating the product thereon so that the first conveyor belt and the second conveyor belt together form a V-shape conveying surface along which the product is conveyed.

2. The apparatus of claim 1, wherein the entry conveyor comprises a first conveyor member extending from the entry end to the exit end of the entry conveyor and a second conveyor member extending from the entry end to the exit end of the entry conveyor, the first and second conveyor members of the entry conveyor operating cooperatively to convey the product from the entry end toward the exit end of the entry conveyor,
   wherein a second angle measured from the first conveyor member to the second conveyor member of the entry conveyor is adjustable prior to a conveying operation to accommodate a bottom of the product so as to reduce shock loading on the weighing device as the product is transferred from the entry conveyor to the weighing conveyor.

3. The apparatus of claim 2, wherein the first angle and the second angle are set at about the same angle that is less than 180 degrees.

4. The apparatus of claim 1 further comprising a labeling conveyor that moves at a third selected speed and having an entry end for receiving the product from the exit end of the weighing conveyor, the labeling conveyor transporting the product by a labeling device configured to affix a label to the product as it is transported thereby by the labeling conveyor.

5. The apparatus of claim 4, wherein the labeling conveyor comprises a first conveyor member extending from the entry end to the exit end of the labeling conveyor and a second conveyor member extending from the entry end to the exit end of the labeling conveyor, the first and second conveyor members of the labeling conveyor operating cooperatively to convey the product from the entry end toward the exit end of the entry conveyor, wherein a second angle measured from the first conveyor member to the second conveyor member of the labeling conveyor is adjustable prior to a conveying operation to accommodate a bottom of the product so as to stabilize the product as it is transferred from the weighing conveyor to the labeling conveyor.

6. The apparatus of claim 5, wherein the entry conveyor comprises a first conveyor member extending from the entry end to the exit end of the entry conveyor and a second conveyor member extending from the entry end to the exit end of the entry conveyor, the first and second conveyor members of the entry conveyor operating cooperatively to convey the product from the entry end toward the exit end of the entry conveyor, wherein a third angle measured from the first conveyor member to the second conveyor member of the entry conveyor is adjustable prior to a conveying operation to accommodate a bottom of the product so as to reduce shock loading on the weighing device as the product is transferred from the entry conveyor to the weighing conveyor.

7. The apparatus of claim 6, wherein the first angle, the second angle and the third angle are each set at about the same that is less than 180 degrees.

8. The apparatus of claim 1 further comprising
a conveyor swivel mount operatively connected to the first and second conveyor members thereby providing a pivot axis for each first and second conveyor member that extends substantially parallel to a conveying direction of the weighing conveyor;
a first conveyor adjustment brace connected to the first conveyor member, the first conveyor adjustment brace configured to be raised and lowered to adjust a vertical orientation of the first conveyor member about its associated pivot axis; and
a second conveyor adjustment brace connected to the second conveyor member, the second conveyor adjustment brace configured to be raised and lowered to adjust a vertical orientation of the second conveyor member about its associated pivot axis.

9. The apparatus of claim 8 further comprising
a conveyor mount plate upon which the conveyor swivel mount is connected;
a loadcell plate carrying the conveyor mount plate and connected to the weighing device; and
a dampening member located between the conveyor mount plate and the loadcell plate.

10. The apparatus of claim 1, wherein the first angle can be set to a plurality of angles ranging between about 180 degrees to about 45 degrees.

11. A method for weighing and labeling of a product in a high speed processing environment, the method comprising:
providing an entry conveyor having an entry end and an exit end;
providing a weighing conveyor having an entry end for receiving the product from the exit end of the entry conveyor and an exit end from which the product is delivered from the weighing conveyor, the weighing conveyor operatively mounted to a weighing device for producing product weight information for the product being transported on the weighing conveyor, the weighing conveyor comprising a first conveyor member extending from the entry end to the exit end of the weighing conveyor and a second conveyor member extending from the entry end to the exit end of the weighing conveyor, the first and second conveyor members operating cooperatively to convey the product from the entry end toward the exit end;
adjusting a first angle measured from the first conveyor member to the second conveyor member prior to a conveying operation to accommodate a bottom of the product thereby reducing shock loading on the weighing device as the product is transferred from the entry conveyor to the weighing conveyor;
providing a labeling conveyor that moves at a third selected speed and having an entry end for receiving the product from the exit end of the weighing conveyor, the labeling conveyor transporting the product by a labeling device configured to affix a label to the product as it is transported thereby by the labeling conveyor; and
affixing a label to the product using the labeling device.

12. The method of claim 11, wherein the entry conveyor comprises a first conveyor member extending from the entry end to the exit end of the entry conveyor and a second conveyor member extending from the entry end to the exit end of the entry conveyor, the first and second conveyor members of the entry conveyor operating cooperatively to convey the product from the entry end toward the exit end of the entry conveyor; and
adjusting a second angle measured from the first conveyor member to the second conveyor member of the entry conveyor prior to a conveying operation to accommodate a bottom of the product so as to reduce shock loading on the weighing device as the product is transferred from the entry conveyor to the weighing conveyor.

13. The method of claim 12, wherein the first angle and the second angle are set at about the same angle that is less than 180 degrees.

14. The method of claim 11, wherein the labeling conveyor comprises a first conveyor member extending from the entry end to the exit end of the labeling conveyor and a second conveyor member extending from the entry end to the exit end of the labeling conveyor, the first and second conveyor members of the labeling conveyor operating cooperatively to convey the product from the entry end toward the exit end of the entry conveyor; and
adjusting a second angle measured from the first conveyor member to the second conveyor member of the labeling conveyor prior to a conveying operation to accommodate a bottom of the product so as to stabilize the product as it is transferred from the weighing conveyor to the labeling conveyor.

15. An apparatus for weighing and labeling of a product in a high speed processing environment, the apparatus comprising:
an entry conveyor having an entry end and an exit end; and
a weighing conveyor having an entry end for receiving the product from the exit end of the entry conveyor and an exit end from which the product is delivered from the weighing conveyor, the weighing conveyor operatively mounted to a weighing device to produce product weight information for the product being transported on the weighing conveyor,
the weighing conveyor comprising a first conveyor member extending from the entry end to the exit end of the weighing conveyor and a second conveyor member extending from the entry end to the exit end of the weighing conveyor, the first and second conveyor members operating cooperatively to convey the product from the entry end toward the exit end,
wherein each first conveyor member and second conveyor member is adjustable independently of the other conveyor member to an angle relative to the horizontal to form a variety of conveyor surface configurations;

wherein the first conveyor member includes a first conveyor belt extending from the entry end to the exit end of the weighing conveyor and the second conveyor member includes a second conveyor belt extending from the entry end to the exit end of the weighing conveyor.

16. The apparatus of claim 15, wherein each first conveyor member and second conveyor member is adjustable to an angle of between about zero degrees to about 90 degrees relative to the horizontal.

17. The apparatus of claim 15, wherein the weighing conveyor further comprises a side guide connected to at least one of the first and second conveyor member, the side guide contacting a surface of the product as the product moves along the weighing conveyor.

18. The apparatus of claim 15 further comprising a conveyor swivel mount operatively connected to the first and second conveyor members thereby providing a pivot axis for each first and second conveyor member that extends substantially parallel to a conveying direction of the weighing conveyor;

a first conveyor adjustment brace connected to the first conveyor member, the first conveyor adjustment brace configured to be raised and lowered to adjust a vertical orientation of the first conveyor member about its associated pivot axis; and a second conveyor adjustment brace connected to the second conveyor member, the second conveyor adjustment brace configured to be raised and lowered to adjust a vertical orientation of the second conveyor member about its associated pivot axis.

19. An apparatus for weighing and labeling of a product in a high speed processing environment, the apparatus comprising:

an entry conveyor having an entry end and an exit end;

a weighing conveyor having an entry end for receiving the product from the exit end of the entry conveyor and an exit end from which the product is delivered from the weighing conveyor, the weighing conveyor operatively mounted to a weighing device to produce product weight information for the product being transported on the weighing conveyor, the weighing conveyor comprising a first conveyor member extending from the entry end to the exit end of the weighing conveyor and a second conveyor member extending from the entry end to the exit end of the weighing conveyor, the first and second conveyor members operating cooperatively to convey the product from the entry end toward the exit end, wherein a first angle measured from the first conveyor member to the second conveyor member is adjustable prior to a conveying operation to accommodate a bottom of the product so as to reduce shock loading on the weighing device as the product is transferred from the entry conveyor to the weighing conveyor; and a labeling conveyor that moves at a third selected speed and having an entry end for receiving the product from the exit end of the weighing conveyor, the labeling conveyor transporting the product by a labeling device configured to affix a label to the product as it is transported thereby by the labeling conveyor.

* * * * *